(12) United States Patent
Li

(10) Patent No.: US 10,963,542 B2
(45) Date of Patent: Mar. 30, 2021

(54) BLOCKCHAIN-BASED IMAGE PROCESSING METHOD AND APPARATUS

(71) Applicant: ADVANCED NEW TECHNOLOGIES CO., LTD., Grand Cayman (KY)

(72) Inventor: Zhiguo Li, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/866,526

(22) Filed: May 4, 2020

(65) Prior Publication Data
US 2020/0265124 A1 Aug. 20, 2020

Related U.S. Application Data

(63) Continuation of application No. PCT/CN2020/071012, filed on Jan. 8, 2020.

(30) Foreign Application Priority Data

May 13, 2019 (CN) .......................... 201910392621.1

(51) Int. Cl.
G06F 21/10 (2013.01)
H04L 9/06 (2006.01)
G06F 17/16 (2006.01)

(52) U.S. Cl.
CPC ............. *G06F 21/10* (2013.01); *G06F 17/16* (2013.01); *H04L 9/0637* (2013.01); *H04L 2209/38* (2013.01)

(58) Field of Classification Search
CPC .................................................... G06F 21/10
See application file for complete search history.

(56) References Cited

U.S. PATENT DOCUMENTS 7,281,272 B1 * 10/2007 Rubin ................ H04N 1/00244
726/26
8,571,993 B2 10/2013 Kocher et al.
(Continued)

FOREIGN PATENT DOCUMENTS

CN 106682457 A 5/2017
CN 106997388 A 8/2017
(Continued)

OTHER PUBLICATIONS

First Search dated May 12, 2020, issued in related Chinese Application No. 201910392621.1 (2 pages).
(Continued)

*Primary Examiner* — Josnel Jeudy

(57) ABSTRACT

Methods, systems, and apparatus, including computer programs encoded on computer storage media, for a blockchain-based image processing are provided. One of the methods comprises: displaying, by a terminal device, a target image; obtaining, by the terminal device, information of a copyright owner of the target image and a current display environment of the target image; sending, by the terminal device, the obtained information to one or more blockchain nodes configured to obtain ciphertext information by encrypting the obtained information and to store the ciphertext information in a blockchain; obtaining, by the terminal device, the ciphertext information from the blockchain; and updating, by the terminal device, historical information in a pixel matrix of the target image based on the ciphertext information.

15 Claims, 11 Drawing Sheets

(56) References Cited

U.S. PATENT DOCUMENTS

| | | | |
|---|---|---|---|
| 9,430,140 | B2 | 8/2016 | Reuschel et al. |
| 10,264,041 | B2 | 4/2019 | Bologh |
| 10,645,180 | B1 | 5/2020 | Batey et al. |
| 2004/0044670 | A1* | 3/2004 | Cazier ................ H04N 1/32144 |
| 2010/0074443 | A1* | 3/2010 | Ishii ................... H04N 1/32144 |
| | | | 380/243 |
| 2016/0283920 | A1 | 9/2016 | Fisher et al. |
| 2017/0116693 | A1 | 4/2017 | Rae et al. |
| 2017/0206523 | A1* | 7/2017 | Goeringer ............ G06Q 20/409 |
| 2017/0324711 | A1 | 11/2017 | Feeney et al. |
| 2018/0068091 | A1 | 3/2018 | Gaidar et al. |
| 2018/0343110 | A1 | 11/2018 | Funk |
| 2019/0155997 | A1* | 5/2019 | Vos ...................... G06F 21/105 |
| 2019/0251648 | A1* | 8/2019 | Liu .................. H04N 21/23418 |
| 2019/0278944 | A1* | 9/2019 | Cheng .................. G06F 21/645 |
| 2019/0294761 | A1 | 9/2019 | Kim et al. |
| 2019/0347243 | A1* | 11/2019 | Wilkinson ............ H04L 9/0637 |
| 2019/0361867 | A1 | 11/2019 | Nilsson et al. |
| 2019/0379531 | A1* | 12/2019 | Aleksander ........... G06F 16/152 |
| 2020/0034792 | A1 | 1/2020 | Rogers et al. |
| 2020/0052882 | A1* | 2/2020 | Tummalapenta ....... G06F 21/62 |
| 2020/0136799 | A1* | 4/2020 | Smith ................. H04L 63/0428 |

FOREIGN PATENT DOCUMENTS

| | | |
|---|---|---|
| CN | 107330338 A | 11/2017 |
| CN | 108833099 A | 11/2018 |
| CN | 109002487 A | 12/2018 |
| CN | 109145632 A | 1/2019 |
| CN | 109376504 A | 2/2019 |
| CN | 109493224 A | 3/2019 |
| CN | 109711120 A | 5/2019 |
| CN | 110263502 A | 9/2019 |
| EP | 3605370 A2 | 2/2020 |
| JP | 2018-133080 A | 8/2018 |

OTHER PUBLICATIONS

First Office Action dated May 21, 2020, issued in related Chinese Application No. 201910392621.1, with English machine translation (8 pages).

International Search Report and Written Opinion of the International Searching Authority for International Application No. PCT/CN2020/071012, made available to the public on Nov. 19, 2020, with partial machine English translation, 9 pages.

* cited by examiner 1  1  [0]  0  0  1  [1]  0  1  1  [1]  0  1
1  0  [0]  1  0  1  [0]  0  0  1  1  1
0  1  0  1  1  0  1  0  1  1
1  1  1  0  0  1  1  1  0  1
0  1  1  0  1  1  0  0  1  1
0  1  1  1  0  1  0  1  1  0
1  0  1  0  1  0  1  0  1  1
0  1  0  1  0  1  0  1  0  1

$$\begin{array}{ccccc} 1 & 1 & 0 & 0 & 1 \\ 1 & 0 & 1 & 0 & 1 \\ 0 & 1 & 0 & 1 & 1 \\ 1 & 1 & 1 & 0 & 0 \end{array} \qquad \begin{array}{ccccccccc} 0 & \boxed{0} & 1 & \boxed{1} & 1 & \boxed{1} & 0 & \boxed{0} & 1 \\ 0 & \boxed{1} & 0 & \boxed{1} & 1 & \boxed{1} & 1 & \boxed{0} & 1 \\ 0 & 1 & 0 & 1 & 1 & & & & \\ 1 & 1 & 1 & 0 & 1 & & & & \end{array}$$

$$\begin{array}{ccccc} 0 & 1 & 1 & 0 & 1 \\ 0 & 1 & 1 & 1 & 0 \\ 1 & 0 & 1 & 0 & 1 \\ 0 & 1 & 0 & 1 & 0 \end{array} \qquad \begin{array}{ccccc} 1 & 0 & 0 & 1 & 1 \\ 1 & 0 & 1 & 1 & 0 \\ 0 & 1 & 0 & 1 & 1 \\ 1 & 0 & 1 & 0 & 1 \end{array}$$

FIG. 5(d)

$$\begin{array}{cccccccccccccc} 1 & \boxed{0} & 1 & \boxed{1} & 0 & 0 & 1 & 0 & \boxed{1} & 1 & \boxed{0} & 1 & 0 & 1 \\ 1 & 0 & 1 & 0 & 1 & 0 & 0 & 1 & 1 & 1 & & & & \\ 0 & 1 & 0 & 1 & 1 & 0 & 1 & 0 & 1 & 1 & & & & \\ 1 & 1 & 1 & 0 & 0 & 1 & 1 & 1 & 0 & 1 & & & & \\ 0 & \boxed{1} & 1 & \boxed{1} & 1 & 0 & 1 & 1 & \boxed{1} & 0 & \boxed{0} & 0 & 1 & 1 \\ 0 & 1 & 1 & 1 & 0 & 1 & 0 & 1 & 1 & 0 & & & & \\ 1 & 0 & 1 & 0 & 1 & 0 & 1 & 0 & 1 & 1 & & & & \\ 0 & 1 & 0 & 1 & 0 & 1 & 0 & 1 & 0 & 1 & & & & \end{array}$$

FIG. 5(e)

BLOCKCHAIN-BASED IMAGE PROCESSING METHOD AND APPARATUS

CROSS-REFERENCE TO RELATED APPLICATION

This application is a continuation application of International Patent Application No. PCT/CN2020/071012, filed with the China National Intellectual Property Administration (CNIPA) on Jan. 8, 2020, which is based on and claims priority to and benefit of Chinese Patent Application No. 201910392621.1, filed with the CNIPA on May 13, 2019. The entire contents of all of the above-identified applications are incorporated herein by reference.

TECHNICAL FIELD

The specification relates to the technical field of blockchains, and in particular, to a blockchain-based image processing method, system, storage medium, and apparatus.

BACKGROUND

With the rapid development of computer and Internet technologies, it becomes more convenient for people to obtain various information. As a result, however, it also becomes extremely convenient for people to freely plagiarize and disseminate other people's creation without consent of authors. For example, people freely plagiarize an original image by a user on a website, take a screenshot of an image on a website, or take a photo of an image being displayed on a website, which leads to infringement of the image copyright of the user.

Therefore, there is a need for a reliable solution to protect the copyright of images created by a user.

SUMMARY

The embodiments of the specification provide a blockchain-based image processing method, system, storage medium, device, and apparatus. Each time when a target image is displayed via a terminal device, historical identification information in a pixel matrix of the target image is updated based on copyright owner information and current environment information of the target image, so that the target image carries the copyright owner information, thereby facilitating copyright protection against a future image infringement. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack via a screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

To solve the above-described technical problems, the embodiments of the specification are implemented as follows.

The embodiments of the specification provide a blockchain-based image processing method, comprising: obtaining, when displaying a target image via a terminal device, relevant information of the target image, wherein the relevant information comprises copyright owner information and current environment information of the target image, and the environment information comprises at least one piece of the following information: time information, geographic location information, and information of the terminal device; publishing the relevant information to a blockchain for a node device in the blockchain to encrypt the relevant information to obtain corresponding ciphertext information; obtaining the ciphertext information from the blockchain; and updating, based on the ciphertext information, historical identification information existing in a pixel matrix of the target image, wherein the historical identification information is determined based on relevant information of the target image during a previous display.

The embodiments of the specification further provide a blockchain-based image processing apparatus, comprising: a first obtaining module configured to obtain, when displaying a target image via a terminal device, relevant information of the target image, wherein the relevant information comprises copyright owner information and current environment information of the target image, and the environment information comprises at least one piece of the following information: time information, geographic location information, and information of the terminal device; a publishing module configured to publish the relevant information to a blockchain for a node device in the blockchain to encrypt the relevant information to obtain corresponding ciphertext information; a second obtaining module configured to obtain the ciphertext information from the blockchain; and an updating module configured to update, based on the ciphertext information, historical identification information existing in a pixel matrix of the target image, wherein the historical identification information is determined based on relevant information of the target image during the previous display.

The embodiments of the specification further provide a blockchain-based image processing device, comprising: a processor, and a memory configured to store a computer executable instruction, wherein the executable instruction, when being executed, causes the processor to: obtain, when displaying a target image via a terminal device, relevant information of the target image, wherein the relevant information comprises copyright owner information and current environment information of the target image, and the environment information comprises at least one piece of the following information: time information, geographic location information, and information of the terminal device; publish the relevant information to a blockchain for a node device in the blockchain to encrypt the relevant information to obtain corresponding ciphertext information; obtain the ciphertext information from the blockchain; and update, based on the ciphertext information, historical identification information existing in a pixel matrix of the target image, wherein the historical identification information is determined based on relevant information of the target image during the previous display.

The embodiments of the specification further provide a storage medium configured to store a computer executable instruction, wherein the executable instruction, when being executed, implements the following process of: obtaining, when displaying a target image via a terminal device, relevant information of the target image, wherein the relevant information comprises copyright owner information and current environment information of the target image, and the environment information comprises at least one piece of the following information: time information, geographic location information, and information of the terminal device; publishing the relevant information to a blockchain for a node device in the blockchain to encrypt the relevant information to obtain corresponding ciphertext information; obtaining the ciphertext information from the blockchain; and updating, based on the ciphertext information, historical identification information existing in a pixel matrix of the target image, wherein the historical identification information is determined based on relevant information of the target image during the previous display.

According to some embodiments, the specification provides a method for blockchain-based image processing. The method comprises: displaying, by a terminal device, a target image; obtaining, by the terminal device, information of a copyright owner of the target image and a current display environment of the target image; sending, by the terminal device, the obtained information to one or more blockchain nodes configured to obtain ciphertext information by encrypting the obtained information and to store the ciphertext information in a blockchain; obtaining, by the terminal device, the ciphertext information from the blockchain; and updating, by the terminal device, historical information in a pixel matrix of the target image based on the ciphertext information.

In an embodiment, the information of the current display environment of the target image comprises: a current time; a current geographic location of the terminal device; or information of the terminal device.

In an embodiment, the historical information comprises information associated with a previous instance in which the target image was displayed.

In an embodiment, the updating historical information in a pixel matrix of the target image based on the ciphertext information comprises: encoding the ciphertext information to obtain a binary string corresponding to the ciphertext information; and replacing the historical information with the binary string.

In an embodiment, the replacing the historical information with the binary string comprises:

determining a plurality of positions in the pixel matrix respectively associated with a plurality of characters of the historical information; replacing the character at each of the positions with a character of the binary string.

In an embodiment, the method further comprises: recording information of a process of updating the historical information in the pixel matrix; and sending the recorded information to the one or more blockchain nodes for storing in the blockchain.

In an embodiment, the information of the copyright owner comprises a name of the copyright owner or an ID number of the copyright owner, and the information of the current display environment comprises a Media Access Control (MAC) address and/or an Internet Protocol (IP) address of the terminal device.

According to some embodiments, the specification provides a system for blockchain-based image processing. The system comprises: a processor and a non-transitory computer-readable storage medium storing instructions executable by the processor to cause the system to perform operations. The operations include: displaying, by a terminal device, a target image; obtaining, by the terminal device, information of a copyright owner of the target image and a current display environment of the target image; sending, by the terminal device, the obtained information to one or more blockchain nodes configured to obtain ciphertext information by encrypting the obtained information and to store the ciphertext information in a blockchain; obtaining, by the terminal device, the ciphertext information from the blockchain; and updating, by the terminal device, historical information in a pixel matrix of the target image based on the ciphertext information.

According to some embodiments, the specification provides a non-transitory computer-readable storage medium for blockchain-based image processing. The storage medium is configured with instructions executable by one or more processors to cause the one or more processors to perform operations. The operations include: displaying, by a terminal device, a target image; obtaining, by the terminal device, information of a copyright owner of the target image and a current display environment of the target image; sending, by the terminal device, the obtained information to one or more blockchain nodes configured to obtain ciphertext information by encrypting the obtained information and to store the ciphertext information in a blockchain; obtaining, by the terminal device, the ciphertext information from the blockchain; and updating, by the terminal device, historical information in a pixel matrix of the target image based on the ciphertext information.

According to the technical solutions of the embodiments, each time when a target image is displayed via a terminal device, historical identification information in a pixel matrix of the target image is updated based on copyright owner information and current environment information of the target image, so that the target image carries the copyright owner information, thereby facilitating copyright protection against a future image infringement. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack via a screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

BRIEF DESCRIPTION OF THE DRAWINGS

To more clearly describe the technical solutions of the embodiments of the specification or of the current technologies, the accompanying drawings to be used in the description of the embodiments or the current technologies will be briefly described below. The accompanying drawings in the description below are merely some of the embodiments of the specification. Other drawings may be obtained by one of ordinary skill in the art without creative effort according to these accompanying drawings.

FIG. 3(b) is a diagram of the updated pixel matrix of the target image in the blockchain-based image processing method according to some embodiments of the specification.

FIG. 5(a) is a diagram of the pixel matrix of the pre-publishing target image in the blockchain-based image processing method according to some embodiments of the specification.

FIG. 5(b) is a first diagram of the pixel matrix with relevant information of the target image inserted into the pixel matrix of the pre-publishing target image in the blockchain-based image processing method according to some embodiments of the specification.

FIG. 5(c) is a diagram of dividing the pixel matrix of the pre-publishing target image into a plurality of pixel regions in the blockchain-based image processing method according to some embodiments of the specification.

FIG. 5(d) is a second diagram of the pixel matrix with relevant information of the target image inserted into the pixel matrix of the pre-publishing target image in the blockchain-based image processing method according to some embodiments of the specification.

FIG. 5(e) is a third diagram of the pixel matrix with relevant information of the target image inserted into the pixel matrix of the pre-publishing target image in the blockchain-based image processing method according to some embodiments of the specification.

DETAILED DESCRIPTION

To enable those skilled in the art to better understand the technical solutions of the specification, the technical solutions of the embodiments of the specification will be completely and thoroughly described below with reference to the accompanying drawings in the embodiments of the specification. The described embodiments are merely some, but not all, embodiments of the specification. All other embodiments obtained, based on some embodiments of the specification, by one of ordinary skill in the art without creative effort shall fall within the protection scope of the specification.

The embodiments of the specification provide a blockchain-based image processing method, apparatus, system, device, and a storage medium. Each time when a target image is displayed by a terminal device, historical identification information in a pixel matrix of the image is updated based on copyright owner information and current environment information of the image, thereby facilitating copyright protection for the image.

The blockchain-based image processing method according to the embodiments of the specification may be applied to a terminal device, such as a cell phone, a tablet computer, a computer, and the like, and may also be applied to a server. Namely, the execution entity of the blockchain-based image processing method according to the embodiments of the specification may be a terminal device or a server, and may be a blockchain-based image processing apparatus installed on the terminal device or server.

In some application scenarios, the method according to the embodiments of the specification may also be implemented through interaction between a server and a terminal device. Namely, some steps of the method may be executed through the terminal device, and some steps may be executed through the server, which will be described later through embodiments.

Figure 1:
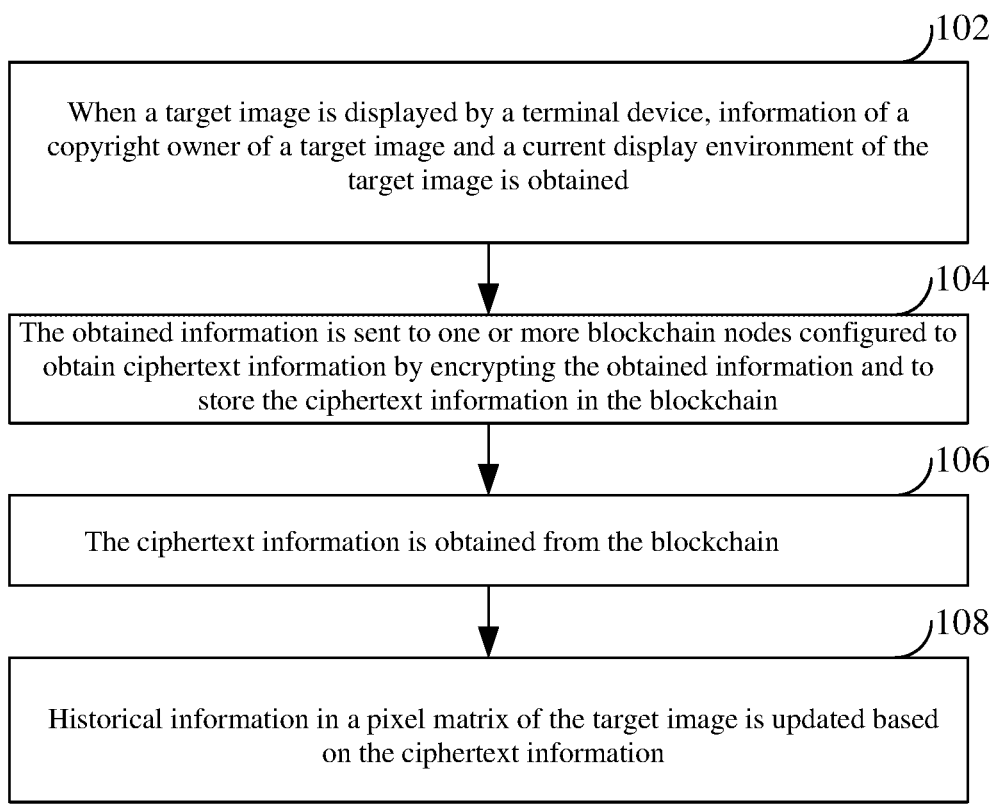
FIG. 1 is a first flow chart of the blockchain-based image processing method according to some embodiments of the specification.

FIG. 1 is a first flow chart of the blockchain-based image processing method according to some embodiments of the specification. The method shown in FIG. 1 comprises the following steps.

In Step 102, when a target image is displayed by a terminal device, relevant information of the target image is obtained, wherein the relevant information comprises information of a copyright owner (i.e., copyright owner information) of the target image and information of current display environment (i.e., current environment information) of the target image, and the environment information comprises at least one of the following information: time information, geographic location information, and terminal device information.

Herein, the terminal device may be a smart device, such as a cell phone, a tablet computer, a computer, and the like.

The target image displayed by the terminal device may be an image in an offline environment such as an image stored on the terminal device, or may be an image in an online environment such as an image on a website browsed by a user. In an embodiment, if the target image is an image in an offline environment, the execution entity of the method according to the embodiments of the specification is a terminal device. If the target image is an image in an online environment, the execution entity of the method according to the embodiments of the specification may be a server, a terminal device, or a terminal device and a server, i.e., a joint execution through interaction between the terminal device and the server.

In the embodiments of the specification, the copyright owner may be a creator of the target image, may be an authorized user or owner of the target image, or the like.

The copyright owner information comprises at least a name of the copyright owner, an ID number of the copyright owner, or a combination thereof. In an embodiment, information of the copyright owner, such as address information, gender, age, occupation, and the like, may also be added, as long as the copyright owner information comprises the information capable of uniquely identifying the copyright owner. The copyright owner information may comprise other suitable information.

In the embodiments of the specification, the environment information may comprise time information, geographic location information, terminal device information, or any combination thereof. Herein, the geographic location information may be information of a current geographic location positioned by the terminal device when the target image is displayed, the time information may be a time when the target image is displayed, and the terminal device information may be identification information of the terminal device capable of displaying the target image, which may comprise a Media Access Control (MAC) address and/or an Internet Protocol (IP) address of the terminal device. In an embodiment, the terminal device information may be a MAC address of the terminal device or an IP address of the terminal device, or may simultaneously comprise a MAC address and an IP address.

In Step 104, the relevant information is sent to one or more blockchain nodes of a blockchain, and the one or more blockchain nodes (i.e., a node device in the blockchain) are configured to encrypt the relevant information to obtain corresponding ciphertext information, and store the ciphertext information in the blockchain.

In the embodiments of the specification, since the obtained relevant information of the target image contains lots of information, the relevant information has a large data volume. To embed the relevant information of the target image into the pixel matrix of the target image, the above obtained relevant information may be compressed. For example, the compression of the relevant information may be achieved through encryption.

In an embodiment, the relevant information may be sent to a blockchain, and a node device in the blockchain encrypts the relevant information. Through the encryption, the relevant information may be converted to a ciphertext string, thereby achieving the compression of the relevant information and further improving the security of the relevant information. The ciphertext string may be stored in the blockchain.

An encryption algorithm such as Hash may be used for the encryption of the relevant information. If the Hash algorithm is used for the encryption of the relevant information, a Hash conversion is performed on the relevant information to obtain a Hash value corresponding to the relevant information. Other encryption algorithms may also be used for the encryption of the relevant information, which will not be enumerated in the embodiments of the specification.

Moreover, when the relevant information is encrypted in the embodiments of the specification, the relevant information needs to be uploaded or sent to the blockchain for encryption. In this way, due to the immutability of the blockchain, the authenticity of the relevant information can be ensured, which may achieve unique tracking of the image copyright against a future image infringement.

In Step 106, the ciphertext information is obtained from the blockchain.

In Step 108, historical information (i.e., historical identification information) in a pixel matrix of the target image is updated based on the ciphertext information, wherein the historical information comprises information associated with a previous instance in which the target image was displayed, and the historical identification information may be determined based on relevant information of the target image during a previous display.

In the embodiments of the specification, each time when a target image is displayed, the historical identification information currently in a pixel matrix of the target image and embedding the relevant information of a previous display of the target image is updated, so that the relevant information at the time of the current display is embedded into the pixel matrix each time when the target image is displayed. If someone obtains the target image in an unauthorized manner through screenshots or photographing during the current display of the target image, copyright tracking may be performed based on the current environment information, such as the time, location, and device ID of the terminal device taking the screenshots, and copyright owner information embedded in the target image, thereby protecting the copyright of the target image.

In an embodiment, in the above-described Step 108, updating, based on the ciphertext information, the historical identification information in a pixel matrix of the target image comprises, Step I and Step II as follows.

In Step I, the ciphertext information is encoded to obtain a binary string corresponding to the ciphertext information as current identification information of the target image.

In Step II, the current identification information is used to replace the historical identification information.

In the Step I, any encoding manner may be used to convert the ciphertext information into a binary string, i.e., obtaining a string consisting of a series of characters 0 and 1, and this binary string is used as the current identification information of the target image.

The historical identification information is also a binary string and is obtained by encoding the ciphertext information corresponding to the relevant information of the target image when the target image was displayed at a previous time.

In some embodiments, each time when the target image is displayed, the same encryption algorithm may be used for encrypting relevant information of the target image, and the same encoding manner may also be used for encoding the encrypted ciphertext. In this way, the current identification information and the historical identification information may contain the same number of binary characters.

Different encryption algorithms and encoding manners may also be used for processing.

Figures 2, 3A:
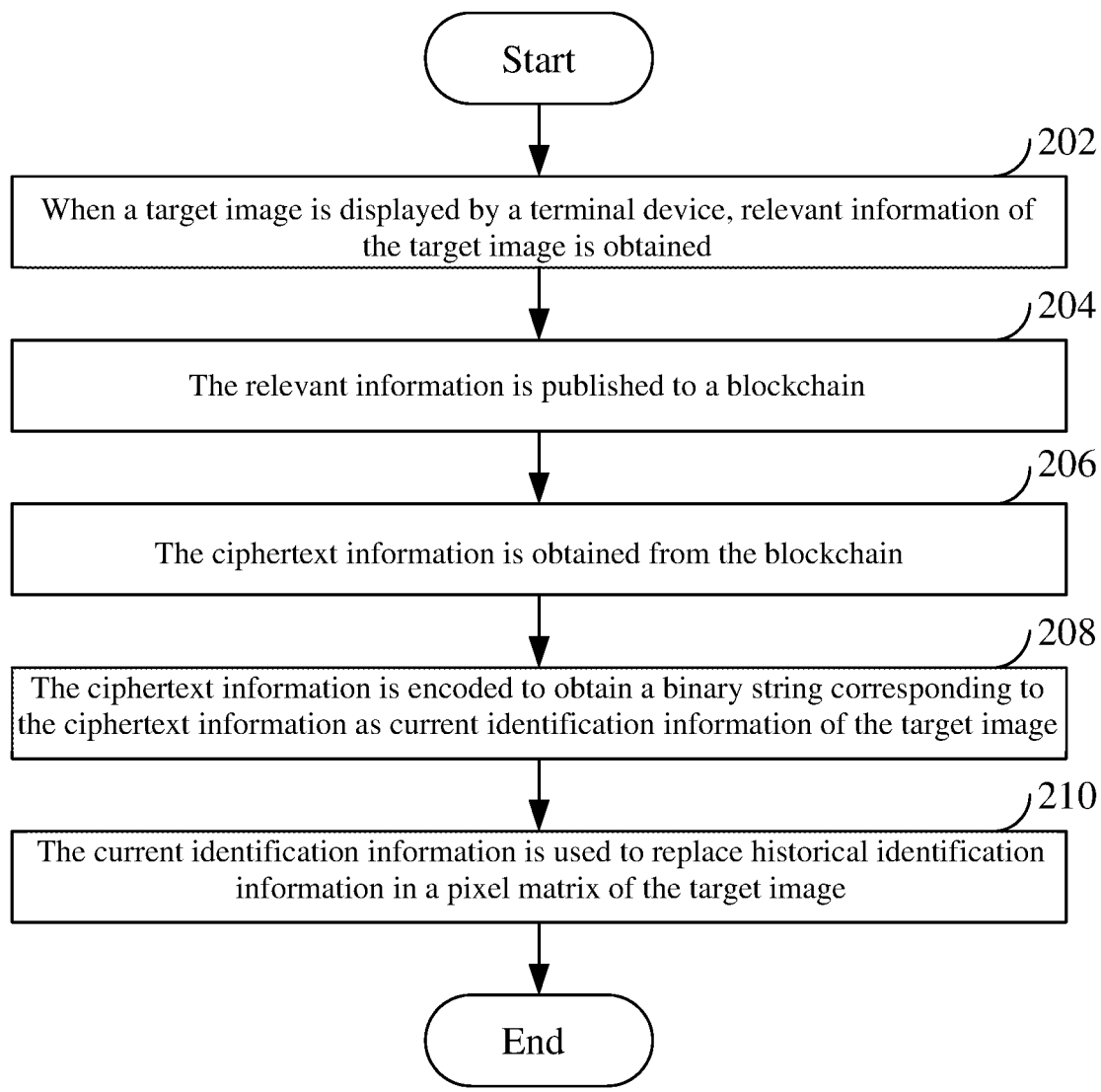
FIG. 2 is a second flow chart of the blockchain-based image processing method according to some embodiments of the specification.
FIG. 3(a) is a diagram of the pre-update pixel matrix of the target image in the blockchain-based image processing method according to some embodiments of the specification.

FIG. 2 is a second flow chart of the blockchain-based image processing method according to some embodiments of the specification. The method shown in FIG. 2 comprises the following steps.

In Step 202, when a target image is displayed by a terminal device, relevant information of the target image is obtained.

The relevant information may comprise copyright owner information and current environment information of the target image, and the environment information may comprise at least one piece of the following information: time information, geographic location information, and terminal device information.

In Step 204, the relevant information is published to a blockchain. The relevant information is sent to one or more blockchain nodes of a blockchain, so that a node device in the blockchain encrypts the relevant information to obtain corresponding ciphertext information, and stores the ciphertext information in the blockchain.

In Step 206, the ciphertext information is obtained from the blockchain.

In Step 208, the ciphertext information is encoded to obtain a binary string corresponding to the ciphertext information as current identification information of the target image.

In Step 210, the current identification information is used to replace historical identification information in a pixel matrix of the target image.

The historical identification information may be determined based on the relevant information of the target image when the target image was displayed at a previous time, and the historical identification information is also a binary string.

In an embodiment, in the above-described Step II, using the identification information to replace the historical identification information comprises: determining the respective positions of each historical binary character of the historical identification information in the pixel matrix; and using each historical binary character of the historical identification information to respectively replace the historical binary character at each of the positions.

In the embodiments of the specification, to determine position information of each binary character of the identification information in the pixel matrix, after each time that the embedded identification information in the pixel matrix of the target image is updated, the position information of each binary character in the pixel matrix and the historical binary character replaced by each binary character may be recorded.

For ease of understanding, the above-described replacing process will be described below.

For example, in an embodiment, historical identification information currently in the pixel matrix of the target image is 00110, and the pixel matrix of the target image embedding the historical identification information is shown in FIG. 3(a). Moreover, in FIG. 3(a), a box is used to mark each historical binary character in the historical identification information. When the target image is displayed, if the current identification information obtained based on current relevant information of the target image is 01100, each binary character in the current identification information (i.e., 01100) is used to replace each historical binary character (i.e., 00110) marked in FIG. 3(a), and a pixel matrix obtained after the replacement is shown in FIG. 3(b). The first binary character in the current identification information is used to replace the first historical binary character in the historical identification information, the second binary character in the current identification information is used to replace the second historical binary character in the historical identification information, and so on.

Embodiments corresponding to FIG. 3(a) and FIG. 3(b) are both examples in the description.

Moreover, in some embodiment, the number of binary characters in the currently determined identification information may be not equal to the number of historical binary characters in the historical identification information. For example, the number of binary characters in the current identification information may be greater than the number of historical binary characters in the historical identification information, or the number of binary characters in the current identification information may be less than the number of historical binary characters in the historical identification information. If the number of binary characters in the currently determined identification information is greater than the number of historical binary characters in the historical identification information, multiple, such as two or three, binary characters may be used to replace one historical binary character (i.e., a binary character in the historical identification information) at some positions. If the number of binary characters in the currently determined identification information is less than the number of binary characters in the historical identification information, the historical binary characters embedded at some positions may be directly deleted.

Figure 4:
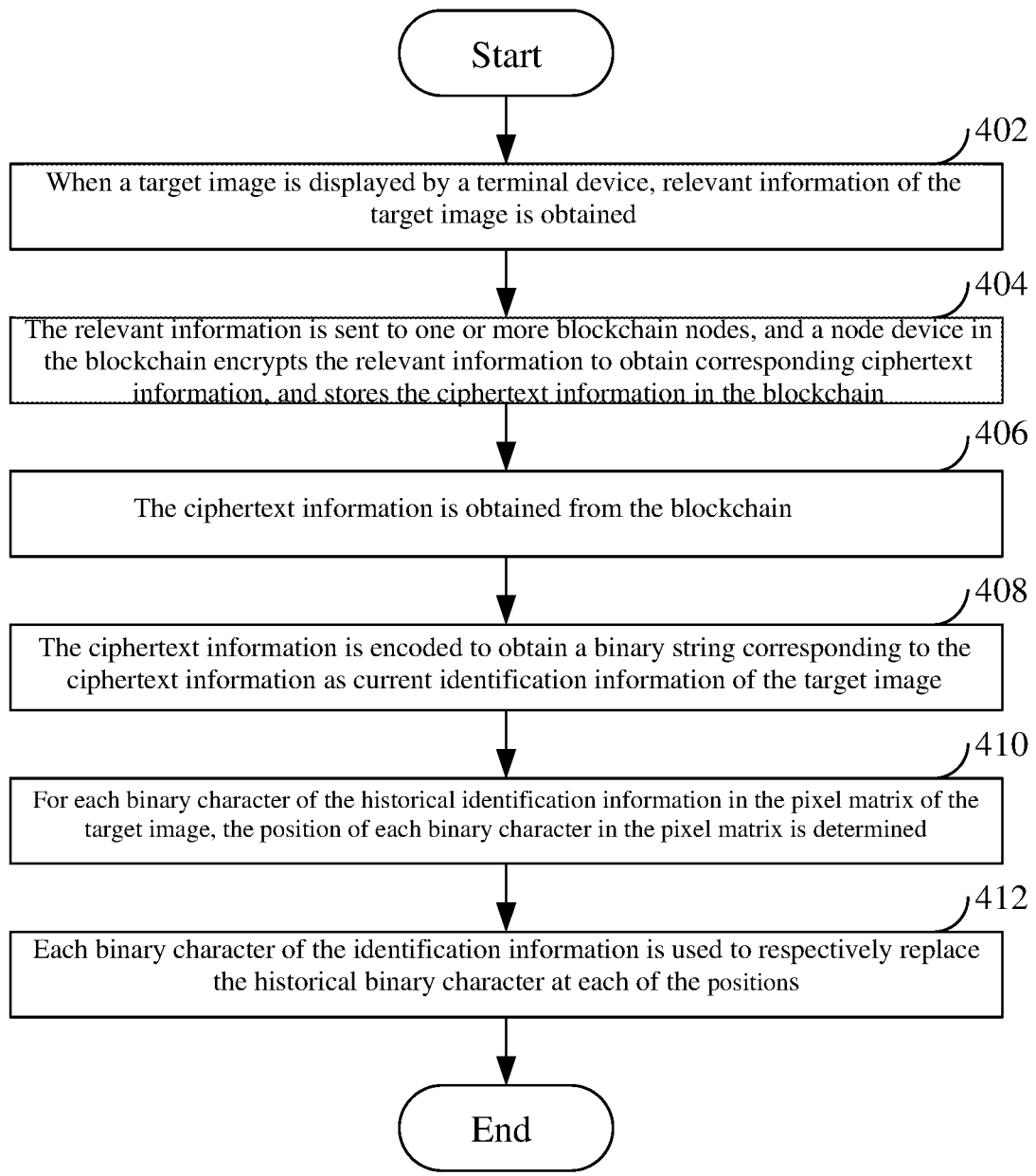
FIG. 4 is a third flow chart of the blockchain-based image processing method according to some embodiments of the specification.

FIG. 4 is a third flow chart of the blockchain-based image processing method according to some embodiments of the specification. The method shown in FIG. 4 comprises the following steps.

In Step 402, when a target image is displayed by a terminal device, relevant information of the target image is obtained.

The relevant information may comprise copyright owner information and current environment information of the target image, and the environment information comprises at least one piece of the following information: time information, geographic location information, and terminal device information.

In Step 404, the relevant information is sent to one or more blockchain nodes of a blockchain, and a node device in the blockchain encrypts the relevant information to obtain corresponding ciphertext information, and stores the ciphertext information in the blockchain.

In Step 406, the ciphertext information is obtained from the blockchain.

In Step 408, the ciphertext information is encoded to obtain a binary string corresponding to the ciphertext information as current identification information of the target image.

In Step 410, for each historical binary character of the historical identification information in the pixel matrix of the target image, the position of each historical binary character in the pixel matrix is determined.

In Step 412, each binary character of the identification information is used to respectively replace the historical binary character at each of the positions.

In addition, in the embodiments of the specification, to facilitate viewing the embedded position information of each historical binary character of the historical identification information each time when the historical identification information embedded in the pixel matrix of the target image is updated, in the above-described Step 108, after updating the historical identification information in a pixel matrix of the target image based on the ciphertext information, the method according to the embodiments of the specification further comprises recording information of a process of updating the historical information (i.e., the historical identification information) in the pixel matrix, and sending the recorded information to one or more blockchain nodes for storing in the blockchain.

In the embodiments of the specification, since the historical identification information and the identification information both are formed by binary strings, the information of the updating process may comprise the binary string obtained by encoding the current ciphertext information and positions where the historical binary characters are respectively replaced by the binary characters in the binary string.

In addition, in the embodiments of the specification, the recorded information of the updating process above is uploaded to the blockchain for storage. Due to the immutability of the blockchain, the authenticity and immutability of the updating process information are thus ensured. When the target image is displayed later, the information of the updating process may be obtained from the blockchain to determine information of positions of the historical binary characters in the pixel matrix.

In an embodiment, before the above-described Step 102 is executed, the method according to the embodiments of the specification may further comprise the following steps: obtaining copyright owner information and current environment information of the target image, wherein the current environment information comprises at least one piece of the following information: current time information, current geographic location information, and information of the terminal device currently being used; generating identification information of the target image based on the copyright owner information and current environment information; and embedding the identification information into the pixel matrix of the target image.

In an embodiment, the relevant information of a creator of the target image and current environment information may be embedded into the pixel matrix of the target image after the creator completes the creation of the target image, but before the creator publishes the target image. Alternatively, the relevant information of an owner of the target image and current environment information may be embedded into the pixel matrix of the target image after the owner of the target image obtains the target image, etc.

The current environment information in some embodiments may comprise current time information, current geographic location information, information of the terminal device currently being used, or a combination thereof. Moreover, the current time information refers to the time information when the pixel matrix of the target image is processed, the current geographic location information refers to information of a geographic location where the pixel matrix of the target image is processed, the terminal device currently being used may be a terminal device or server currently used for processing the pixel matrix, and the information of the terminal device currently being used may be identification information of the device currently being used, which may be a MAC address and/or an IP address when a terminal device is used.

The above-described embodiment will be described in detail below.

In an embodiment, the copyright owner information and current environment information of a target image may be obtained before the target image is published. The copyright owner information and current environment information may be uploaded to blockchain nodes of a blockchain, and a node device in the blockchain encrypts the copyright owner information and current environment information to obtain ciphertext information corresponding to the copyright owner information and current environment information, and the ciphertext information is sent to the blockchain for storage. Then, the ciphertext information is obtained from the blockchain and encoded to obtain a binary string corresponding to the ciphertext information, and the binary string is inserted, according to an insert rule, into the pixel matrix of the target image, or the binary string is used to replace a redundant pixels in the pixel matrix of the target image.

For example, inserting, according to an insert rule, the binary string into the pixel matrix of the target image may comprise the following several cases.

1. Each binary character in the binary string is inserted into the pixel matrix of the target image according to a character interval.

2. The pixel matrix is divided into a plurality of pixel regions according to a dividing rule, and the binary string is inserted into at least one designated pixel region.

3. The pixel matrix is divided into a plurality of pixel regions according to a dividing rule, and a part or a portion of characters of the binary string is inserted into each pixel region.

The circumstances will be described one by one below.

In case 1, each binary character in the binary string is inserted into the pixel matrix of the target image according to a character interval, which may start from any position of the pixel matrix, and one character in the binary string is inserted in every character interval, such as two or three pixels.

For example, in an embodiment, the pixel matrix corresponding to the target image is an 8*10 pixel matrix. Namely, the pixel matrix comprises 8 rows of pixels and 10 columns of pixels, as shown in FIG. 5(a). The binary string obtained according to the copyright owner information and current environment information of the target image is 01101110. The binary string may be inserted into the pixel matrix of the target image by inserting one binary character every three pixels starting from the third pixel of each row of pixels. FIG. 5(b) is a diagram of the pixel matrix obtained after the insertion, and the inserted binary characters are pixels marked by boxes in FIG. 5(b). Then, an image is generated based on the pixel matrix corresponding to FIG. 5(b). Each time when the target image is displayed, the target image generated based on the pixel matrix corresponding to FIG. 5(b) is displayed. Moreover, at the time of each display, the binary string currently in the pixel matrix of the target image is replaced based on the relevant information of the target image at the time of the display.

With regard to case 2, the pixel matrix of the target image may be divided into a plurality of pixel regions, and the binary string may be inserted into the one or several pixel regions as described above.

For example, the pixel matrix shown in FIG. 5(a) may be divided into four pixel regions, and the divided pixel matrix is shown in FIG. 5(c). The binary string may be inserted into one of the four pixel regions as described above. For example, the binary string may be inserted into the second pixel region. When the binary string (01101110) is inserted into the second pixel region of the pixel matrix, each binary character in the binary string may be inserted into the second pixel region of the pixel matrix according to an insert rule (e.g., inserting one binary character every other pixel starting from the second pixel of each row of pixels), and FIG. 5(d) is a diagram of the pixel matrix obtained after the insertion.

In the embodiments of the specification, the binary string may also be split. The binary characters in the binary string are split into multiple portions, and the number of the portions after splitting is equal to the number of pixel regions after the division. One portion of the binary characters is inserted into each pixel region.

For example, for the pixel matrix shown in FIG. 5(c), the obtained binary string 01101110 may be divided into four portions equally or randomly. For example, the binary characters in the binary string are equally divided into four parts, 01, 10, 11, and 10, respectively. 01 may be inserted into the first pixel region, 10 may be inserted into the second pixel region, 11 may be inserted into the third pixel region, and 10 may be inserted into the fourth pixel region. The same insert rule or different insert rules may be applied in the pixel regions. In some embodiments, for all the pixel regions, one binary character is inserted every other pixel starting from the second pixel of each row of pixels, and FIG. 5(e) is a diagram of the pixel matrix obtained after the insertion.

Furthermore, some redundant pixels may exist in an image. Therefore, in the embodiments of the specification, the binary characters in the binary string may also be used to directly replace redundant pixels in the pixel matrix of the target image.

In an embodiment, if the number of redundant pixels in the pixel matrix of the target image is equal to the number of binary characters in the binary string, the binary characters in the binary string may be directly used to sequentially replace redundant pixels in the pixel matrix. If the number of redundant pixels is greater than the number of binary characters in the binary string, a number of redundant pixels equal to the number of binary characters in the binary string may be selected, and each of the binary characters in the binary string is used to respectively replace each of the selected redundant pixels. If the number of redundant pixels is less than the number of binary characters in the binary string, the same number of binary characters may be used to replace the redundant pixels, while the remaining binary characters may be inserted into the pixel matrix according to a rule. Alternatively, if the number of redundant pixels is less than the number of binary characters in the binary string, two or more binary characters may be used to replace one redundant pixel.

The blockchain-based image processing method according to some embodiments of the specification will be described below with reference to embodiments of the specification.

Figure 6:
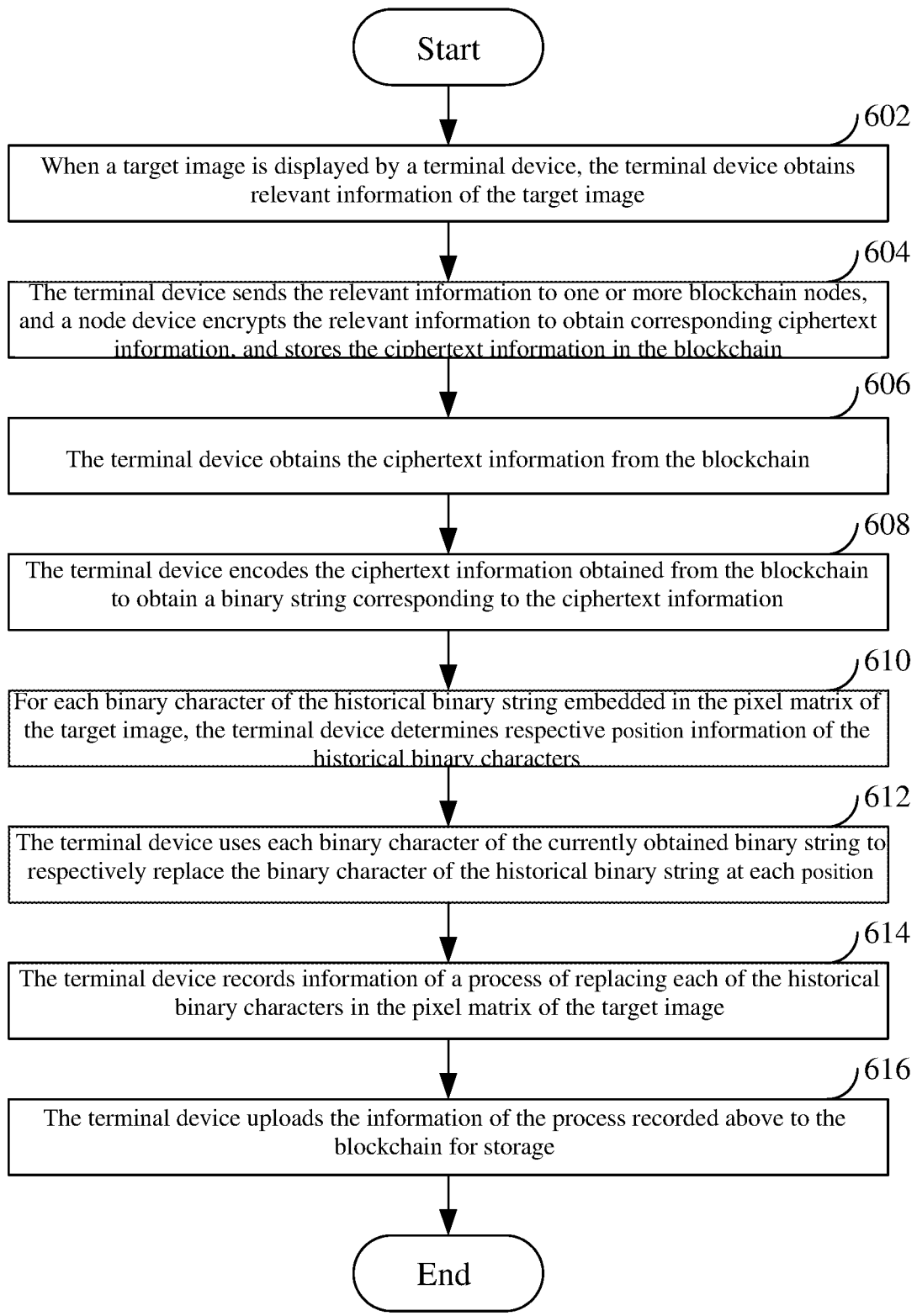
FIG. 6 is a fourth flow chart of the blockchain-based image processing method according to some embodiments of the specification.

In an embodiment, if a target image is a target image stored on a terminal device, the terminal device may carry out the above processing operations on the target image when the terminal device is used to display the target image. FIG. 6 is a fourth flow chart of the blockchain-based image processing method according to some embodiments of the specification. The method shown in FIG. 6 comprises the following steps.

In Step 602, when a target image is displayed by a terminal device, the terminal device obtains relevant information of the target image.

In an example, the relevant information comprises copyright owner information and current environment information of the target image, and the environment information comprises current display time information, current geographic location information, and the terminal device information.

The copyright owner information may be obtained from attribute information of the target image. The current display time information may be time information currently displayed by the terminal device. The current geographic location information may be information of a geographic location positioned by the terminal device, i.e., may be obtained from the positioning information of the terminal device. The terminal device information may be a MAC address and/or an IP address of the terminal device.

In Step 604, the terminal device sends the relevant information to one or more blockchain nodes of a blockchain, so that a node device in the blockchain encrypts the relevant information to obtain corresponding ciphertext information, and stores the ciphertext information in the blockchain.

In Step 606, the terminal device obtains the ciphertext information from the blockchain.

In Step 608, the terminal device encodes the ciphertext information obtained from the blockchain to obtain a binary string corresponding to the ciphertext information.

In Step 610, for each historical binary character of the historical binary string embedded in the pixel matrix of the target image, the terminal device determines respective position information of the historical binary characters.

In an embodiment, the terminal device may read, from the blockchain, information of the updating process of a previous update of the historical binary string in the pixel matrix of the target image, and determine information of positions of the historical binary characters in the pixel matrix based on the information of the updating process.

In Step 612, the terminal device uses each binary character of the currently obtained binary string to respectively replace the historical binary character at each of the positions.

In Step 614, the terminal device records information of a process of replacing each of the historical binary characters in the pixel matrix of the target image.

In Step 616, the terminal device uploads the information of the process recorded above to the blockchain for storage.

Figure 7:
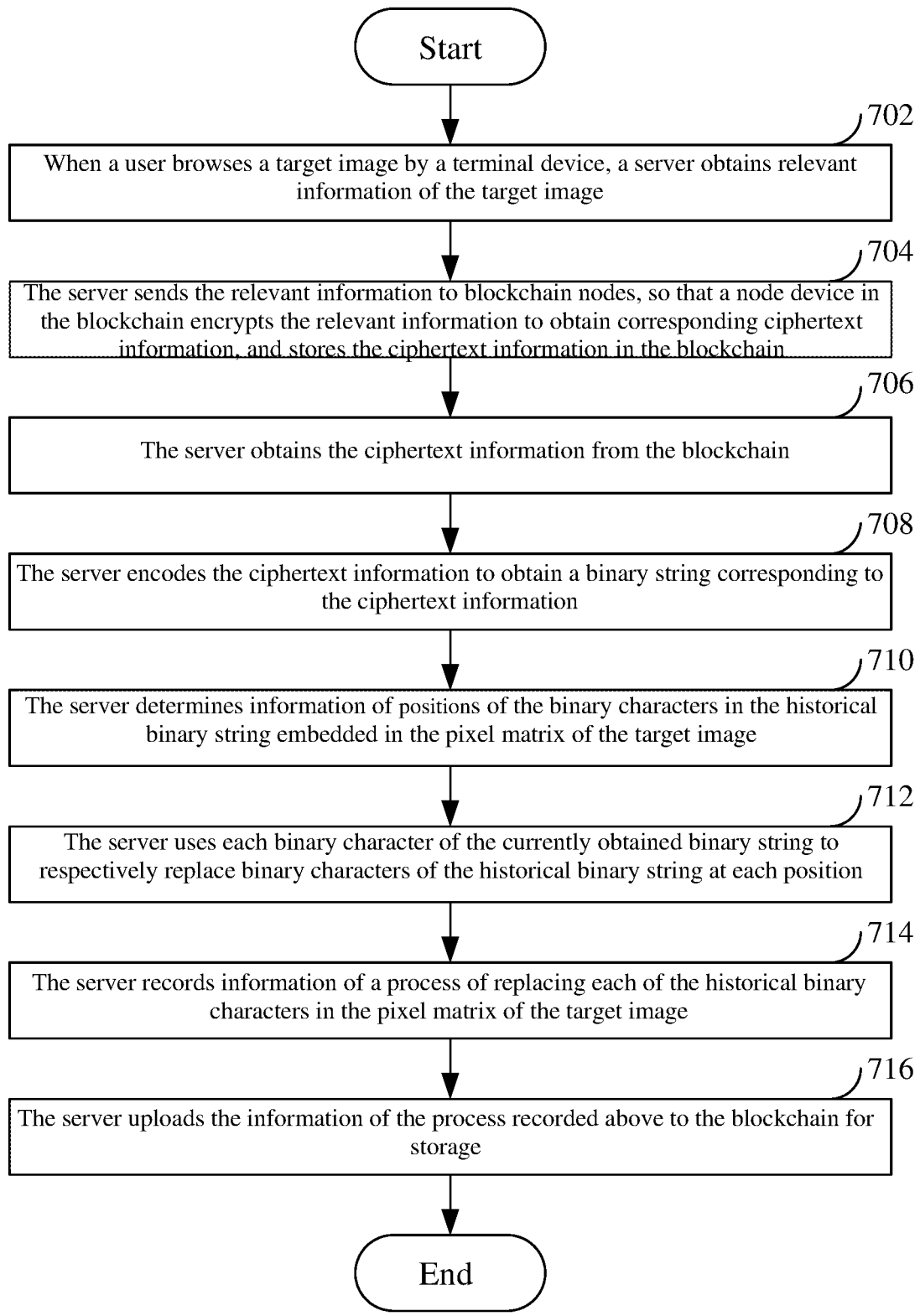
FIG. 7 is a fifth flow chart of the blockchain-based image processing method according to some embodiments of the specification.

In another embodiment, if a target image is an image displayed on some websites, the image is displayed by a terminal device when a user browses the website. Then, a server corresponding to the website may carry out the above processing operations on the target image when the terminal device is used to display the target image. For example, a user browses a photo on Baidu website, then the Baidu server may carry out the above processing operations on the image. FIG. 7 is a fifth flow chart of the blockchain-based image processing method according to some embodiments of the specification. The method shown in FIG. 7 comprises the following steps.

In Step 702, when a user browses a target image by a terminal device, a server obtains relevant information of the target image.

The relevant information comprises copyright owner information and current environment information of the target image, and the current environment information comprises information of the time when the target image is displayed, geographic location information of the terminal device, terminal device information, or a combination thereof.

In an embodiment, the server may obtain, from itself, information of the time when the terminal device displays the target image, and may obtain, from the terminal device, geographic location information currently positioned by the terminal device and terminal device information, wherein the terminal device information may be a MAC address and/or an IP address of the terminal device.

In Step 704, the server sends the relevant information to one or more blockchain nodes of a blockchain, so that a node device in the blockchain encrypts the relevant information to obtain corresponding ciphertext information, and stores the ciphertext information in the blockchain.

In Step 706, the server obtains the ciphertext information from the blockchain.

In Step 708, the server encodes the ciphertext information to obtain a binary string corresponding to the ciphertext information.

In Step 710, the server determines information of positions of the historical binary characters in the historical binary string embedded in the pixel matrix of the target image.

In an embodiment, the server may read, from the blockchain, information of the updating process of a previous update of the historical binary string in the pixel matrix of the target image, and determine information of positions of the historical binary characters in the pixel matrix based on the updating process information.

In Step 712, the server uses each binary character of the currently obtained binary string to respectively replace the historical binary character of the historical binary string at each of the positions.

In Step 714, the server records information of a process of replacing each of the historical binary characters in the pixel matrix of the target image.

In Step 716, the server uploads the information of the process recorded above to the blockchain for storage.

Figure 8:
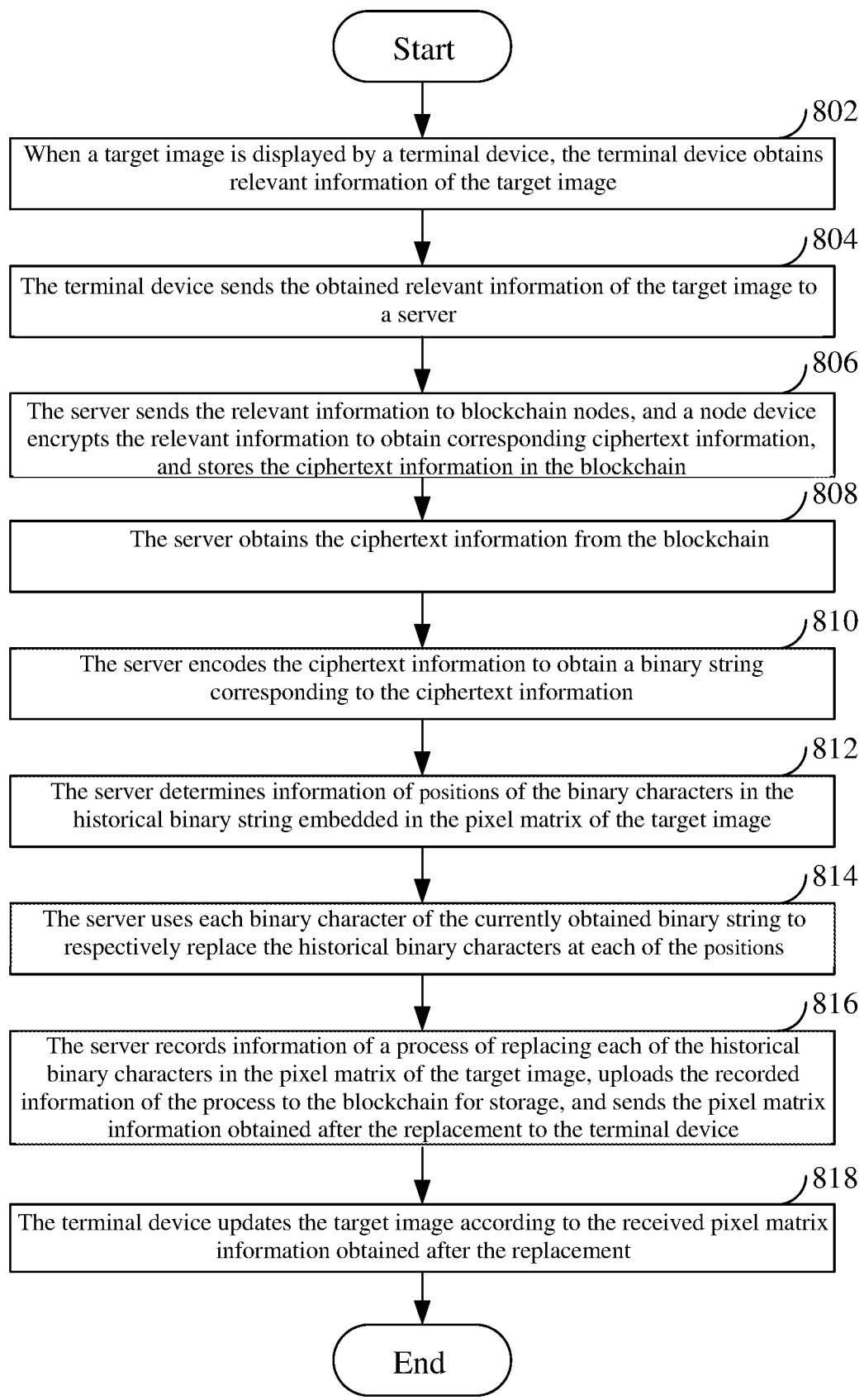
FIG. 8 is a sixth flow chart of the blockchain-based image processing method according to some embodiments of the specification.

For example, in some embodiments, if a target image is an image stored on a terminal device, a server may also carry out the above processing on the image when a user is browsing the image using the terminal device. FIG. 8 is a sixth flow chart of the blockchain-based image processing method according to some embodiments of the specification. The method shown in FIG. 8 comprises the following steps.

In Step 802, when a target image is displayed by a terminal device, the terminal device obtains relevant information of the target image.

The relevant information comprises copyright owner information and current environment information of the target image, and the environment information comprises current display time information, current geographic location information, and information of the terminal device.

In an embodiment, the copyright owner information may be obtained from attribute information of the target image. The current display time information may be time information currently displayed by the terminal device. The current geographic location information may be information of a geographic location positioned by the terminal device, i.e., may be obtained from the positioning information of the terminal device. The terminal device information may be a MAC address and/or an IP address of the terminal device.

In Step 804, the terminal device sends the obtained relevant information of the target image to a server.

In Step 806, the server sends the relevant information to blockchain nodes, so that a node device in the blockchain encrypts the relevant information to obtain corresponding ciphertext information, and stores the ciphertext information in the blockchain.

In Step 808, the server obtains the ciphertext information from the blockchain.

In Step 810, the server encodes the ciphertext information to obtain a binary string corresponding to the ciphertext information.

In Step 812, the server determines information of positions of the historical binary characters in the historical binary string embedded in the pixel matrix of the target image.

In an embodiment, the server may read, from the blockchain, information of an updating process of a previous update of the historical binary string in the pixel matrix of the target image, and determine information of positions of the historical binary characters in the pixel matrix based on the information of the updating process.

In Step 814, the server uses each binary character of the currently obtained binary string to respectively replace the historical binary character at each of the positions.

In Step 816, the server records information of a process of replacing each of the historical binary characters in the pixel matrix of the target image, uploads the recorded process information to the blockchain for storage, and sends the pixel matrix information obtained after the replacement to the terminal device.

In Step 818, the terminal device updates the target image according to the received pixel matrix information obtained after the replacement.

In the embodiments of the specification, the target image is processed through interaction between a server and a terminal device, which can reduce the workload on the terminal device and lower the operating burden on the terminal device.

Implementations of the blockchain-based image processing method according to some embodiments of the specification are listed above with reference to some application scenarios. In addition, other embodiments, such as embodiments for cases of interactions between a server and a terminal device, which will not be enumerated in the embodiments of the specification.

With the blockchain-based image processing method according to some embodiments of the specification, each time when a target image is displayed by a terminal device, historical identification information in a pixel matrix of the target image is updated based on copyright owner information and current environment information of the target image, so that the target image carries the copyright owner information, thereby facilitating copyright protection against a future image infringement. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack through a screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

Figure 9:
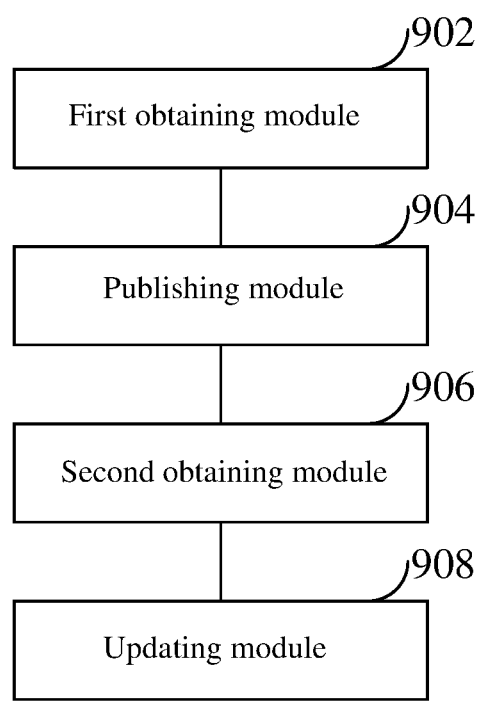
FIG. 9 is a schematic diagram of modules of the blockchain-based image processing apparatus according to some embodiments of the specification.

Corresponding to the blockchain-based image processing method according to some embodiments of the specification, the embodiments of the specification further provide, based on the same concept, a blockchain-based image processing apparatus configured to implement the above-described method according to some embodiments of the specification. FIG. 9 is a schematic diagram of modules of the blockchain-based image processing apparatus according to some embodiments of the specification. The apparatus shown in FIG. 9 comprises the following modules: a first obtaining module 902 configured to obtain, when a target image is displayed by a terminal device, relevant information of the target image, wherein the relevant information comprises copyright owner information and current environment information of the target image, and the environment information comprises at least one piece of the following information: time information, geographic location information, and terminal device information; a publishing module 904 configured to send the relevant information to blockchain nodes, so that a node device in the blockchain encrypts the relevant information to obtain corresponding ciphertext information, and stores the ciphertext information in the blockchain; a second obtaining module 906 configured to obtain the ciphertext information from the blockchain; and an updating module 908 configured to update, based on the ciphertext information, historical identification information in a pixel matrix of the target image, wherein the historical identification information is determined based on relevant information of the target image during the previous display.

In an embodiment, the updating module 908 comprises: an encoding unit configured to encode the ciphertext information to obtain a binary string corresponding to the ciphertext information as current identification information of the target image; and a replacing unit configured to use the identification information to replace the historical identification information.

In an embodiment, the replacing unit is configured, for example, to: determine the respective position of each historical binary character of the historical identification information in the pixel matrix and use each binary character of the identification information to respectively replace the historical binary character at each of the positions.

In an embodiment, the apparatus according to some embodiments of the specification further comprises: a recording module configured to record information of an updating process of updating the historical identification information in the pixel matrix; and a storing module configured to store the updating process information into the blockchain.

In an embodiment, the apparatus according to some embodiments of the specification further comprises: a third obtaining module configured to obtain copyright owner information and current environment information of the target image, wherein the current environment information comprises at least one piece of the following information: current time information, current geographic location information, and information of the terminal device currently being used; a generating module configured to generate identification information of the target image based on the copyright owner information and current environment information; and an embedding module configured to embed the identification information into the pixel matrix of the target image.

In an embodiment, the copyright owner information comprises: a name of the copyright owner and/or an ID number of the copyright owner; and the terminal device information comprises a MAC address and/or an IP address of the terminal device.

The blockchain-based image processing apparatus according to some embodiments of the specification may further implement the method implemented by the blockchain-based image processing apparatus according to FIG. 1 to FIG. 8, and achieve functions of the blockchain-based image processing apparatus according to the embodiments shown in FIG. 1 to FIG. 8, which will not be repeated herein.

With the blockchain-based image processing apparatus according to some embodiments of the specification, each time when a target image is displayed by a terminal device, historical identification information in a pixel matrix of the target image is updated based on copyright owner information and current environment information of the target image, so that the target image carries the copyright owner information, thereby facilitating copyright protection against a future image infringement. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack through a screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

Figure 10:
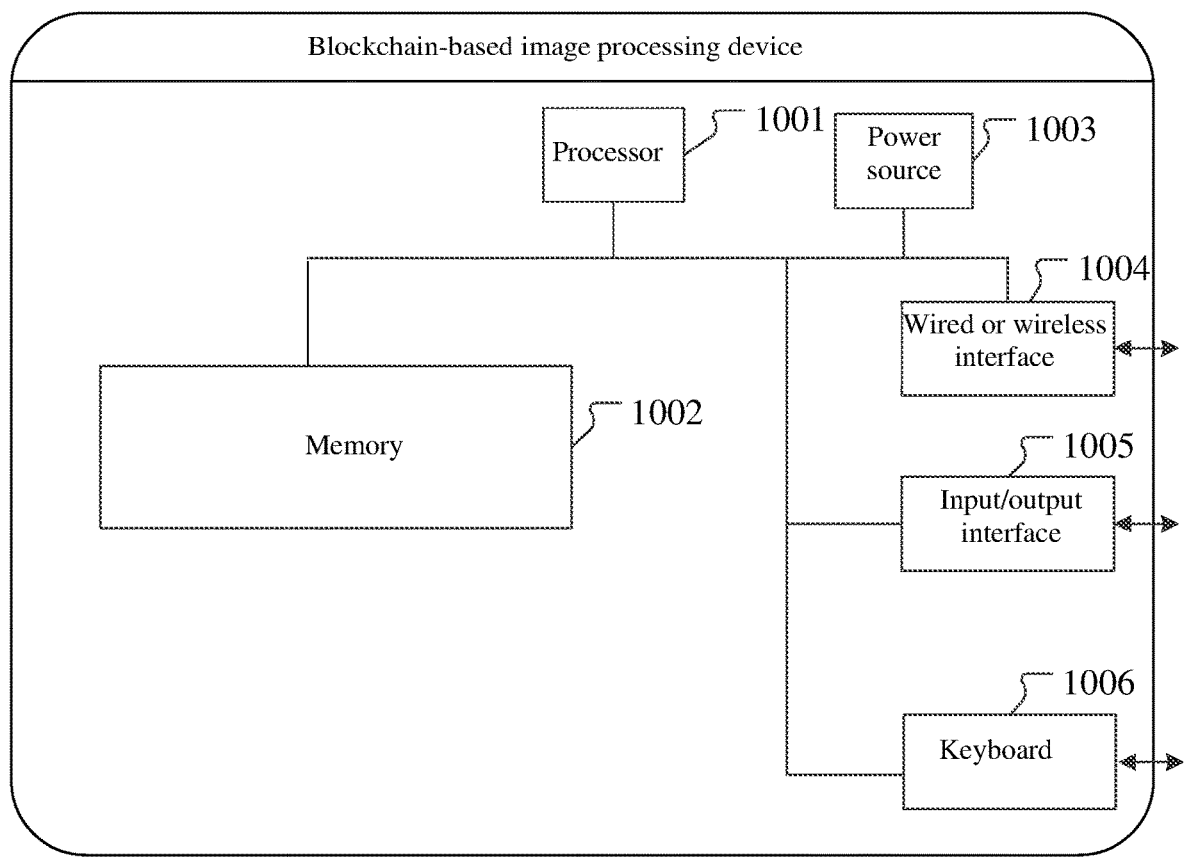
FIG. 10 is a schematic structural diagram of the blockchain-based image processing device according to some embodiments of the specification.

Furthermore, based on the method shown in FIG. 1 to FIG. 8, the embodiments of the specification further provide a blockchain-based image processing device as shown in FIG. 10.

The blockchain-based image processing device may vary significantly due to different configurations or performance, and may comprise one or more processors 1001 and memories 1002. The memory 1002 may store one or more stored applications or data, wherein the memory 1002 may achieve transient storage or persistent storage. An application stored in the memory 1002 may comprise one or more modules (not shown), and each module may comprise information of a series of computer executable instructions in the blockchain-based image processing device. Furthermore, the processor 1001 may be configured to communicate with the memory 1002 and execute the information of a series of computer executable instructions in the memory 1002 on the blockchain-based image processing device. The blockchain-based image processing device may further comprise one or more power sources 1003, one or more wired or wireless network interfaces 1004, one or more input/output interfaces 1005, one or more keyboards 1006, etc.

In an embodiment, the blockchain-based image processing device comprises a memory and one or more programs, wherein the one or more programs are stored in the memory, the one or more programs may comprise one or more modules, and each module may comprise information of a series of computer executable instructions in the blockchain-based image processing device and may be configured to execute, by one or more processors, the one or more programs, for performing the following computer executable instruction information: obtaining, when a target image is displayed by a terminal device, relevant information of the target image, wherein the relevant information comprises copyright owner information and current environment information of the target image, and the environment information comprises at least one piece of the following information: time information, geographic location information, and terminal device information; sending the relevant information to one or more blockchain nodes, so that a node device in the blockchain encrypts the relevant information to obtain corresponding ciphertext information, and stores the ciphertext information in the blockchain; obtaining the ciphertext information from the blockchain; and updating, based on the ciphertext information, historical identification information in a pixel matrix of the target image, wherein the historical identification information is determined based on relevant information of the target image during the previous display.

In an embodiment, when the computer executable instruction information is executed, the updating, based on the cyphertext information, historical identification information in a pixel matrix of the target image comprises: encoding the ciphertext information to obtain a binary string corresponding to the ciphertext information as current identification information of the target image; and using the identification information to replace the historical identification information.

In an embodiment, when the computer executable instruction information is executed, the using the identification information to replace the historical identification information comprises: determining the respective position of each historical binary character of the historical identification information in the pixel matrix; and using each binary character of the identification information to respectively replace the historical binary character at each of the positions.

In an embodiment, when the computer executable instruction information is executed, after updating, based on the cyphertext information, historical identification information in a pixel matrix of the target image, the following steps may be further executed: recording information of an updating process of updating the historical identification information in the pixel matrix, and storing the information of the updating process into the blockchain.

In an embodiment, when the computer executable instruction information is executed, when a target image is displayed by a terminal device, before obtaining relevant information of the target image, the following steps may be further executed: obtaining copyright owner information and current environment information of the target image, wherein the current environment information comprises at least one piece of the following information: current time information, current geographic location information, and information of the terminal device currently being used; and generating identification information of the target image based on the copyright owner information and current environment information, and embedding the identification information into the pixel matrix of the target image.

In an embodiment, the copyright owner information comprises: a name of the copyright owner and/or an ID number of the copyright owner; and the information of the terminal device comprises a MAC address and/or an IP address of the terminal device.

With the blockchain-based image processing device according to some embodiments of the specification, each time when a target image is displayed by a terminal device, historical identification information in a pixel matrix of the target image is updated based on copyright owner information and current environment information of the target image, so that the target image carries the copyright owner information, thereby facilitating copyright protection against a future image infringement. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack through a screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

Furthermore, based on the method shown in FIG. 1 to FIG. 8, the embodiments of the specification further provide a storage medium configured to store computer executable instruction information. In an embodiment, the storage medium may be a flash drive, a CD, a hard drive, and the like. The computer executable instruction information stored in the storage medium may, when being executed by a processor, implement the following process of: obtaining, when a target image is displayed by a terminal device, relevant information of the target image, wherein the relevant information comprises copyright owner information and current environment information of the target image, and the environment information comprises at least one piece of the following information: time information, geographic location information, and terminal device information; sending the relevant information to blockchain nodes, so that a node device in the blockchain encrypts the relevant information to obtain corresponding ciphertext information, and stores the ciphertext information in the blockchain; obtaining the ciphertext information from the blockchain; and updating, based on the ciphertext information, historical identification information in a pixel matrix of the target image, wherein the historical identification information is determined based on relevant information of the target image during the previous display.

In an embodiment, when the computer executable instruction information stored in the storage medium is executed by a processor, the updating, based on the ciphertext information, historical identification information in a pixel matrix of the target image comprises: encoding the ciphertext information to obtain a binary string corresponding to the ciphertext information as current identification information of the target image; and using the identification information to replace the historical identification information.

In an embodiment, when the computer executable instruction information stored in the storage medium is executed by a processor, the using the identification information to replace the historical identification information comprises: determining the respective position of each historical binary character of the historical identification information in the pixel matrix; and using each binary character of the identification information to respectively replace the historical binary character at each of the positions.

In an embodiment, when the computer executable instruction information stored in the storage medium is executed by a processor, after the updating, based on the ciphertext information, historical identification information in a pixel matrix of the target image, the following steps may be further executed: recording information of an updating process of updating the historical identification information in the pixel matrix, and storing the updating process information into the blockchain.

In an embodiment, when the computer executable instruction information stored in the storage medium is executed by a processor, before the obtaining, when a target image is displayed by a terminal device, relevant information of the target image, the following steps may be further executed: obtaining copyright owner information and current environment information of the target image, wherein the current environment information comprises at least one piece of the following information: current time information, current geographic location information, and information of the terminal device currently being used; and generating identification information of the target image based on the copyright owner information and current environment information, and embedding the identification information into the pixel matrix of the target image.

In an embodiment, when the computer executable instruction information stored in the storage medium is executed by a processor, the copyright owner information comprises: a name of the copyright owner and/or an ID number of the copyright owner; and the information of the terminal device comprises a MAC address and/or an IP address of the terminal device.

When the computer executable instruction information stored in the storage medium according to some embodiments of the specification is executed by a processor, each time when a target image is displayed by a terminal device, historical identification information in a pixel matrix of the target image is updated based on copyright owner information and current environment information of the target image, so that the target image carries the copyright owner information, thereby facilitating copyright protection when an image infringement event occurs later. Moreover, each time when the target image is displayed, the historical identification information in the pixel matrix is updated based on the copyright owner information and current environment information of the target image, so that the identification information embedded in the pixel matrix is always generated based on relevant information of the latest display. As a result, when an attack through screenshot or photographing occurs, copyright tracking may be performed based on the environment information carried in the target image, thereby protecting the copyright of the target image. Furthermore, in the embodiments of the specification, relevant information of the target image is encrypted in a blockchain, which may achieve unique tracking of the image copyright due to the immutability of the blockchain, thereby further safeguarding the security of the image copyright.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

In the 1990s, an improvement to a technology can be obviously differentiated into a hardware improvement (e.g., an improvement to a circuit structure, such as a diode, a transistor, a switch, etc.) or a software improvement (an improvement to a flow of a method). With the technological development, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized with a hardware module. For example, Programmable Logic Device (PLD) (e.g., Field Programmable Gate Array (FPGA)) is such integrated circuit of which logic functions are determined by a user through programming the device. A designer programs on his/her own to "integrate" a digital system onto one piece of PLD, who does not need to request a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also be aware that it would be very easy to obtain a hardware circuit to implement a logic method flow by using the above HDLs to carry out a little bit logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, an embedded microcontroller, etc. Therefore, such controller may be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented, for example, by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any of these devices.

For convenience of description, the above apparatus is divided into various units according to functions for description. Functions of the units may be implemented in one or more pieces of software and/or hardware when the specification is implemented.

One of ordinary skill in the art should understand that the embodiments of the specification may be provided as a method, a system, or a computer program product. Therefore, the specification may be implemented as a complete hardware embodiment, a complete software embodiment, or an embodiment combing software and hardware. Moreover, the specification may be in the form of a computer program product implemented on one or more computer usable storage media (including, but not limited to, a magnetic disk memory, CD-ROM, an optical memory, etc.) comprising computer usable program codes.

The specification is described with reference to flowcharts and/or block diagrams of the method, device (system), and computer program product according to the embodiments of the specification. It should be understood that computer program instruction information may be used to implement each process and/or block in the flowcharts and/or block diagrams and a combination of processes and/or blocks in the flowcharts and/or block diagrams. The computer program instruction information may be provided for a general-purpose computer, a special-purpose computer, an embedded processor, or a processor of other programmable data processing devices to generate a machine, causing instruction information executed by a computer or a processor of other programmable data processing devices to generate an apparatus for implementing a function specified in one or more processes in the flowcharts and/or in one or more blocks in the block diagrams.

The computer program instruction information may also be stored in a computer readable memory that can instruct a computer or other programmable data processing devices to work in a particular manner, causing the instruction information stored in the computer readable memory to generate a manufactured article that includes an instruction information apparatus. The instruction information apparatus implements a function specified in one or more processes in the flowcharts and/or in one or more blocks in the block diagrams.

The computer program instruction information may also be loaded onto a computer or other programmable data processing devices, causing a series of operational steps to be performed on the computer or other programmable devices, thereby generating computer-implemented processing. Therefore, the instruction information executed on the computer or other programmable devices provides steps for implementing a function specified in one or more processes in the flowcharts and/or in one or more blocks in the block diagrams.

In a typical configuration, a computation device includes one or more processors (CPUs), input/output interfaces, network interfaces, and a memory.

The memory may include computer readable media, such as a volatile memory, a Random-Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instruction information, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

It should be further noted that the terms of "including," "comprising" or any other variants of the terms are intended to encompass a non-exclusive inclusion, causing a process, method, product, or device comprising a series of elements to not only comprise these elements, but also comprise other elements that are not clearly listed, or further comprise elements that are inherent to the process, method, product, or device. When there is no further restriction, elements defined by the statement "comprising one . . . " does not exclude that a process, method, product, or device comprising the above elements further comprises additional identical elements.

One of ordinary skill in the art should understand that the embodiments of the specification may be provided as a method, a system, or a computer program product. Therefore, the specification may be implemented as a complete hardware embodiment, a complete software embodiment, or an embodiment combing software and hardware. Moreover, the specification may be in the form of a computer program product implemented on one or more computer usable storage media (including, but not limited to, a magnetic disk memory, CD-ROM, an optical memory, etc.) comprising computer usable program codes.

The specification may be described in a regular context of a computer executable instruction information that is executed by a computer, such as a program module. Generally, the program module comprises a routine, a program, an object, a component, a data structure, etc. for executing a particular task or implementing a particular abstract data type. The specification may also be practiced in distributed computing environments. In these distributed computing environments, remote processing devices connected via communication networks carry out tasks. In the distributed computing environments, a program module may be located in local and remote computer storage media, including storage devices.

The embodiments in the specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for related parts.

The above-described is only embodiments of the specification, which are not used to limit the specification. To one of ordinary skill in the art, the specification may have various modifications and changes. Any modification, equivalent substitution, or improvement made within the spirit and principle of the specification shall be encompassed by the claims of the specification.

What is claimed is:

1. A blockchain-based image processing method, comprising:
    displaying, by a terminal device, a target image;
    obtaining, by the terminal device, information of a copyright owner of the target image and a current display environment of the target image;
    sending, by the terminal device, the obtained information to one or more blockchain nodes configured to obtain ciphertext information by encrypting the obtained information and to store the ciphertext information in a blockchain;
    obtaining, by the terminal device, the ciphertext information from the blockchain; and
    updating, by the terminal device, historical information in a pixel matrix of the target image based on the ciphertext information by:
        encoding the ciphertext information to obtain a binary string corresponding to the ciphertext information;
        determining a plurality of positions in the pixel matrix respectively associated with a plurality of characters of the historical information; and
        replacing the character at each of the positions with a character of the binary string.

2. The method of claim 1, wherein the information of the current display environment of the target image comprises;
    a current time;
    a current geographic location of the terminal device; or
    information of the terminal device.

3. The method of claim 1, wherein the historical information comprises information associated with a previous instance in which the target image was displayed.

4. The method of claim 1, further comprising:
recording information of a process of updating the historical information in the pixel matrix; and
sending the recorded information to the one or more blockchain nodes for storing in the blockchain.

5. The method of claim 1, wherein:
the information of the copyright owner comprises a name of the copyright owner or an ID number of the copyright owner; and
the information of the current display environment comprises a Media Access Control (MAC) address and/or an Internet Protocol (IP) address of the terminal device.

6. A blockchain-based image processing system, comprising:
a processor; and
a memory device storing instructions executable by the processor to cause the system to:
display a target image;
obtain information of a copyright owner of the target image and a current display environment of the target image;
send the obtained information to one or more blockchain nodes configured to obtain ciphertext information by encrypting the obtained information and to store the ciphertext information in a blockchain;
obtain the ciphertext information from the blockchain; and
update historical information in a pixel matrix of the target image based on the ciphertext information by executing the instructions to:
encode the ciphertext information to obtain a binary string corresponding to the ciphertext information;
determine a plurality of positions in the pixel matrix respectively associated with a plurality of characters of the historical information; and
replace the character at each of the positions with a character of the binary string.

7. The system of claim 6, wherein the information of the current display environment of the target image comprises:
a current time;
a current geographic location of the terminal device; or
information of the terminal device.

8. The system of claim 6, wherein the historical information comprises information associated with a previous instance in which the target image was displayed.

9. The system of claim 6, wherein the instructions are further executable by the processor to cause the system to:
record information of a process of updating the historical information in the pixel matrix; and
send the recorded information to the one or more blockchain nodes for storing in the blockchain.

10. The system of claim 6, wherein:
the information of the copyright owner comprises a name of the copyright owner or an ID number of the copyright owner; and
the information of the current display environment comprises a Media Access Control (MAC) address and/or an Internet Protocol (IP) address of the terminal device.

11. A non-transitory computer-readable storage medium for blockchain-based image processing, configured with instructions executable by one or more processors to cause the one or more processors to perform operations comprising:
displaying a target image;
obtaining information of a copyright owner of the target image and a current display environment of the target image;
sending the obtained information to one or more blockchain nodes configured to obtain ciphertext information by encrypting the obtained information and to store the ciphertext information in a blockchain;
obtaining the ciphertext information from the blockchain; and
updating historical information in a pixel matrix of the target image based on the ciphertext information by:
encoding the ciphertext information to obtain a binary string corresponding to the ciphertext information;
determining a plurality of positions in the pixel matrix respectively associated with a plurality of characters of the historical information; and
replacing the character at each of the positions with a character of the binary string.

12. The storage medium of claim 11, wherein the information of the current display environment of the target image comprises:
a current time;
a current geographic location of the terminal device; or
information of the terminal device.

13. The storage medium of claim 11, wherein the historical information comprises information associated with a previous instance in which the target image was displayed.

14. The storage of claim 11, wherein the operations further comprise:
recording information of a process of updating the historical information in the pixel matrix; and
sending the recorded information to the one or more blockchain nodes for storing in the blockchain.

15. The storage medium of claim 11, wherein:
the information of the copyright owner comprises a name of the copyright owner or an ID number of the copyright owner; and
the information of the current display environment comprises a Media Access Control (MAC) address and/or an Internet Protocol (IP) address of the terminal device.

* * * * *